(12) United States Patent
Bharadwaj et al.

(10) Patent No.: US 10,243,823 B1
(45) Date of Patent: Mar. 26, 2019

(54) TECHNIQUES FOR USING FRAME DEEP LOOPBACK CAPABILITIES FOR EXTENDED LINK DIAGNOSTICS IN FIBRE CHANNEL STORAGE AREA NETWORKS

(71) Applicant: CISCO TECHNOLOGY, INC., San Jose, CA (US)

(72) Inventors: Harsha Bharadwaj, Bangalore (IN); Nagendran Venugopalan, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 49 days.

(21) Appl. No.: 15/442,425

(22) Filed: Feb. 24, 2017

(51) Int. Cl.
| | |
|---|---|
| *H04L 12/26* | (2006.01) |
| *H04L 29/08* | (2006.01) |
| *H04B 10/077* | (2013.01) |
| *H04L 1/24* | (2006.01) |

(52) U.S. Cl.
CPC ....... *H04L 43/0817* (2013.01); *H04B 10/077* (2013.01); *H04L 1/243* (2013.01); *H04L 43/14* (2013.01); *H04L 67/1097* (2013.01)

(58) Field of Classification Search
CPC ....... H04B 10/077; H04L 1/242; H04L 43/14; H04L 67/1097
See application file for complete search history.

(56) References Cited

U.S. PATENT DOCUMENTS

| | | |
|---|---|---|
| 4,688,695 A | 8/1987 | Hirohata |
| 5,263,003 A | 11/1993 | Cowles et al. |
| 5,339,445 A | 8/1994 | Gasztonyi |
| 5,430,859 A | 7/1995 | Norman et al. |
| 5,457,746 A | 10/1995 | Dolphin |

(Continued)

FOREIGN PATENT DOCUMENTS

| | | |
|---|---|---|
| EP | 2228719 | 9/2010 |
| EP | 2439637 | 4/2012 |

(Continued)

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-qateway-in-the-cloud.

(Continued)

*Primary Examiner* — Chi Ho A Lee
*Assistant Examiner* — Andrew Lee
(74) *Attorney, Agent, or Firm* — Polsinelli PC

(57) ABSTRACT

One embodiment is a method including configuring a first network element of a fiber channel ("FC") network as a generator element, wherein the generator employs a link diagnostic protocol to cause a second network element comprising a peer of the first network element as a reflector element, wherein the first and second elements are connected via a link; entering a first diagnostic phase, wherein in the first diagnostic phase, diagnostic capabilities of the first and second elements are determined; and subsequent to completion of the first diagnostic phase, entering a second diagnostic phase in which a deep loopback test is performed, wherein the deep loopback test comprises a frame level loopback test for exposing an issue in a path between the first and second network elements beyond a Media Access Control ("MAC") layer.

20 Claims, 8 Drawing Sheets

(56) References Cited

U.S. PATENT DOCUMENTS

| | | |
|---|---|---|
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai Moshe et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |

(56) References Cited

U.S. PATENT DOCUMENTS

| | | |
|---|---|---|
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1 | 2/2017 | Dhoolam et al. |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1* | 9/2004 | Fang ............... G02B 6/2931 398/59 |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114611 A1 | 5/2005 | Durham et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0169188 A1* | 8/2005 | Cometto ............... H04L 47/10 370/249 |
| 2005/0185597 A1 | 8/2005 | Le et al. |
| 2005/0188170 A1 | 8/2005 | Yamamoto |
| 2005/0198523 A1* | 9/2005 | Shanbhag ........... H04L 49/356 726/22 |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1* | 3/2006 | Deragon ............... H04L 1/243 370/249 |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1* | 4/2007 | Atkinson ........ H04L 29/12367 370/401 |

(56) References Cited

U.S. PATENT DOCUMENTS

| | | |
|---|---|---|
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1* | 11/2007 | Chamdani ............ H04L 49/357 370/252 |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schüler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1* | 10/2011 | Mizrahi ................ H04L 45/00 370/392 |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1* | 3/2012 | Ko ...................... H04L 43/0858 370/238 |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1* | 8/2012 | Yu ...................... H04L 47/2491 370/235 |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1* | 8/2013 | Dickey ............ H04L 12/40019 370/249 |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |

(56) References Cited

U.S. PATENT DOCUMENTS

| | | |
|---|---|---|
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | Desanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1* | 4/2015 | Wicker, Jr. ......... H04B 17/0082 375/224 |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1* | 5/2016 | Pham ................. H04B 10/0775 398/16 |
| 2016/0205008 A1 | 7/2016 | Dasu et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, SAN Fabric Administration Best Practices Guide, Support Perspective," Brocade Communication Systems, Inc., May 2013, 21 pages.

(56) References Cited

OTHER PUBLICATIONS

Author Unknown, "delphi—Save a CRC value in a file, without altering the actual CRC Checksum?" Stack Overflow, stackoverflow. com, Dec. 23, 2011, XP055130879, 3 pages http://stackoverflow.com/questions/8608219/save-a-crc-value-in-a-file-wihout-altering-the-actual-crc-checksum.

Author Unknown, "EMC Unisphere: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.

Author Unknown, "HP XP Array Manager Software—Overview & Features," Storage Device Management Software; Hewlett-Packard Development Company, 3 pages; © 2013 Hewlett-Packard Development Company, L.P.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 page.

Author Unknown, "Network Transformation with Software-Defined Networking and Ethernet Fabrics," Positioning Paper, 2012, 6 pages, Brocade Communications Systems.

Author Unknown, "Recreating Real Application Traffic in Junosphere Lab," Solution Brief, Juniper Networks, Dec. 2011, 3 pages.

Author Unknown, "Shunra for HP Softwarer," Enabling Confidence in Application Performance Before Deployment, 2010, 2 pages.

Author Unknown, "Software Defined Networking: The New Norm for Networks," White Paper, Open Networking Foundation, Apr. 13, 2012, 12 pages.

Author Unknown, "Software Defined Storage Networks an Introduction," White Paper, Doc # 01-000030-001 Rev. A, Dec. 12, 2012, 8 pages; Jeda Networks, Newport Beach, California, U.S.A.

Author Unknown, "Standard RAID Levels," Wikipedia, the Free Encyclopedia, last updated Jul. 18, 2014, 7 pages; http://en.wikipedia.org/wiki/Standard_RAID_levels.

Author Unknown, "Storage Infrastructure for the Cloud," Solution Brief, © 2012, 3 pages; coraid, Redwood City, California, U.S.A.

Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.

Author Unknown, "The Fundamentals of Software-Defined Storage, Simplicity at Scale for Cloud-Architectures" Solution Brief, 2013, 3 pages; Coraid, Redwood City, California, U.S.A.

Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.

Author Unknown, "Xgig Analyzer: Quick Start Feature Guide 4.0," Feb. 2008, 24 pages, Finisar Corporation, Sunnyvale, California, U.S.A.

Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.

Author Unknown, "Vblock Solution for SAP: Simplified Provisioning for Operation Efficiency," VCE White Paper, VCE—The Virtual Computing Environment Company, Aug. 2011, 11 pages.

Berman, Stuart, et al., "Start-Up Jeda Networks in Software Defined Storage Network Technology," Press Release, Feb. 25, 2013, 2 pages, http://www.storagenewsletter.com/news/startups/jeda-networks.

Borovick, Lucinda, et al., "White Paper, Architecting the Network for the Cloud," IDC Analyze the Future, Jan. 2011, pp. 1-8.

Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.

Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.

Cisco Systems, Inc. "N-Port Virtualization in the Data Center," Cisco White Paper, Cisco Systems, Inc., Mar. 2008, 7 pages.

Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.

Cisco Systems, Inc., "Cisco Prime Data Center Network Manager 6.1," At-A-Glance, © 2012, 3 pages.

Cisco Systems, Inc., "Cisco Prime Data Center Network Manager," Release 6.1 Data Sheet, © 2012, 10 pages.

Cisco Systems, Inc., "Cisco Unified Network Services: Overcome Obstacles to Cloud-Ready Deployments," White Paper, Cisco Systems, Inc., Jan. 2011, 6 pages.

Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.

Cummings, Roger, et al., Fibre Channel—Fabric Generic Requirements (FC-FG), Dec. 4, 1996, 33 pages, American National Standards Institute, Inc., New York, New York, U.S.A.

Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.

Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.

Hatzieleftheriou, Andromachi, et al., "Host-side Filesystem Journaling for Durable Shared Storage," 13$^{th}$ USENIX Conference on File and Storage Technologies (FAST '15), Feb. 16-19, 2015, 9 pages; https://www.usenix.org/system/files/conference/fast15/fast15-paper-hatzieleftheriou.pdf.

Hedayat, K., et al., "A Two-Way Active Measurement Protocol (TWAMP)," Network Working Group, RFC 5357, Oct. 2008, 26 pages.

Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].

Hosterman, Cody, et al., "Using EMC Symmetrix Storage inVMware vSph ere Environments," Version 8.0, EMC$^2$Techbooks, EMC Corporation; published on or about Jul. 8, 2008, 314 pages; [Retrieved and printed Sep. 12, 2013].

Hu, Yuchong, et al., "Cooperative Recovery of Distributed Storage Systems from Multiple Losses with Network Coding," University of Science & Technology of China, Feb. 2010, 9 pages.

Keogh, Eamonn, et al., "Dimensionality Reduction for Fast Similarity Search in Large Time Series Databases," KAIS Long Paper submitted May 16, 2000; 19 pages.

Kolyshkin, Kirill, "Virtualization in Linux," Sep. 1, 2006, pp. 1-5.

Kovar, Joseph F., "Startup Jeda Networks Takes SDN Approach to Storage Networks," CRN Press Release, Feb. 22, 2013, 1 page, http://www.crn.com/240149244/printablearticle.htm.

Lampson, Butler, W., et al., "Crash Recovery in a Distributed Data Storage System," Jun. 1, 1979, 28 pages.

Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.

Lin, Jessica, "Finding Motifs in Time Series," SIGKDD'02 Jul. 23,-26, 2002, 11 pages, Edmonton, Alberta, Canada.

Linthicum, David, "VM Import could be a game changer for hybrid clouds", InfoWorld, Dec. 23, 2010, 4 pages.

Long, Abraham Jr., "Modeling the Reliability of RAID Sets," Dell Power Solutions, May 2008, 4 pages.

Ma, AO, et al., "RAIDShield: Characterizing, Monitoring, and Proactively Protecting Against Disk Failures," FAST '15, 13$^{th}$

(56) References Cited

OTHER PUBLICATIONS

USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.
McQuerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking,' draft-monia-ips-ifcp-00.txt, Dec. 12, 2000, 6 pages.
Mueen, Abdullah, et al., "Online Discovery and Maintenance of Time Series Motifs," KDD'10 the 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Pinheiro, Eduardo, et al., "Failure Trends in a Large Disk Drive Population," FAST '07, $5^{th}$ USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
Schroeder, Bianca, et al., "Disk failures in the real world: What does an MTTF of 1,000,000 hours mean to you?" FAST '07: $5^{th}$ USENIX Conference on File and Storage Technologies, Feb. 13-16, 2007, 16 pages, San Jose, California, U.S.A.
Shue, David, et al., "Performance Isolation and Fairness for Multi-Tenant Cloud Storage," USENIX Association, $10^{th}$ USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "CEPH: Reliable, Scalable, and High-Performance Distributed Storage," Dec. 2007, 239 pages, University of California, Santa Cruz.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," CEPH, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology of China, 2012, 12 pages.
Stamey, John, et al., "Client-Side Dynamic Metadata in Web 2.0," SIGDOC '07, Oct. 22-24, 2007, pp. 155-161.
Aweya, James, et al., "Multi-level active queue management with dynamic thresholds," Elsevier, Computer Communications 25 (2002) pp. 756-771.
Petersen, Chris, "Introducing Lightning: A flexible NVMe JBOF," Mar. 9, 2016, 6 pages.

\* cited by examiner

US 10,243,823 B1

TECHNIQUES FOR USING FRAME DEEP LOOPBACK CAPABILITIES FOR EXTENDED LINK DIAGNOSTICS IN FIBRE CHANNEL STORAGE AREA NETWORKS

TECHNICAL FIELD

This disclosure relates in general to the field of computer networking, and more particularly, though not exclusively, to techniques for using frame deep loopback capabilities for extended link diagnostics in Fibre Channel ("FC") Storage Area Networks ("SANs").

BACKGROUND

In FC SANs, hosts (typically implemented as servers) perform all I/O operations through a host bus adapter ("HBA") and associated driver installed on the host. Applications running in user space on the host use the storage stack for performing data I/O operations. Typical storage stacks of the host operating system ("OS") include a Virtual File System ("VFS")/file system layer in the kernel, and a data block handling layer below it. Below the data block handling layer is a Small Computer Systems Interface ("SCSI") mid-layer that translates the block requests into SCSI commands. The SCSI commands are then transferred to a OS-specific FC driver provided by the HBA vendor that hooks into generic interfaces of the SCSI mid-layer to perform read and write operations using FC transport protocol semantics. The FC driver provides all FC Layer 2 ("L2") functionalities, such as Exchange management. The driver usually also downloads a firmware into flash memory of the HBA during installation. The firmware takes care of all the FC layer 0,1 functionalities like FC framing, signaling, and transmission ("Tx")/receipt ("Rx") of frames through a small form-factor pluggable ("SFP")/transceiver in the HBA. The firmware interrupts the driver for events like frame Rx, loss of signal, etc.

FC is a credited network with no-drop characteristics specifically modelled for storage transport and the host storage stacks typically demand this no-drop behavior; however, issues such as faulty or incorrectly configured hardware, firmware settings, software bugs, for example, in the I/O path can cause frame drops. The FC HBA drivers provide for a configurable number of retries per SCSI command, after which the I/O operation is returned to the host stack as a failure. This condition will initially start showing up as slow application response times on the hosts and if seen on a sustained basis can have detrimental effects like application stall due to stretch of the resources that cache outstanding I/O on the host. Some host stacks might just crash as the I/O queue builds up with no/slow responses. While some hosts can handle it gracefully by logging the event in server logs, restart of the application or the entire OS may be required to recover from a stuck or slow I/O condition.

To handle this type of eventuality without negatively impacting applications, FC SANs built for five 9s reliability are designed with multiple redundant paths (multiple ports in the HBA OR dual HBAs). A path failover is initiated by the host multipathing software when a slow/stuck I/O path is detected. After the path failover, the host moves all I/O to a different path (typically attached to a different port in a different SAN) so that the application can quickly recover from the stuck/slow I/O condition. However, the SAN is still vulnerable due to a failed path in the system. In order to not compromise the network resiliency aspect for a long period of time, the earlier active path should be debugged and faulty component replaced as quickly as possible. Additionally, before new FC devices are added into a production SAN, a last minute "on-switch" component testing may be desirable to sanitize the HBA, switch port, SFPs and cable.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

DETAILED DESCRIPTION OF EXAMPLE EMBODIMENTS

Overview

Figure 1:
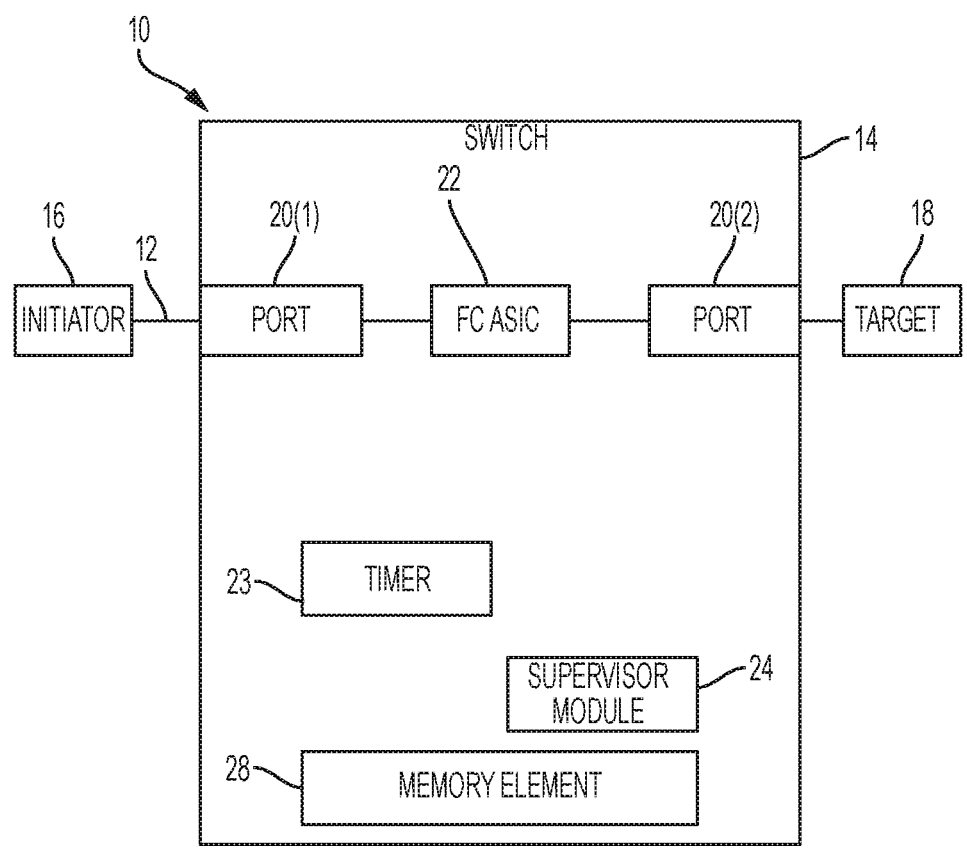
FIG. 1 is a simplified block diagram of a system in which techniques for using frame deep loopback capabilities for extended link diagnostics in FC SANs in accordance with embodiments described herein may be implemented.

One embodiment is a method including configuring a first network element of a fibre channel ("FC") network as a generator element, wherein the generator employs a link diagnostic protocol to cause a second network element comprising a peer of the first network element as a reflector element, wherein the first and second elements are connected via a link; entering a first diagnostic phase, wherein in the first diagnostic phase, diagnostic capabilities of the first and second elements are determined; and subsequent to completion of the first diagnostic phase, entering a second diagnostic phase in which a deep loopback test is performed, wherein the deep loopback test comprises a frame level loopback test for exposing an issue in a path between the first and second network elements beyond a Media Access Control ("MAC") layer.

Example Embodiments

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object-oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3A:
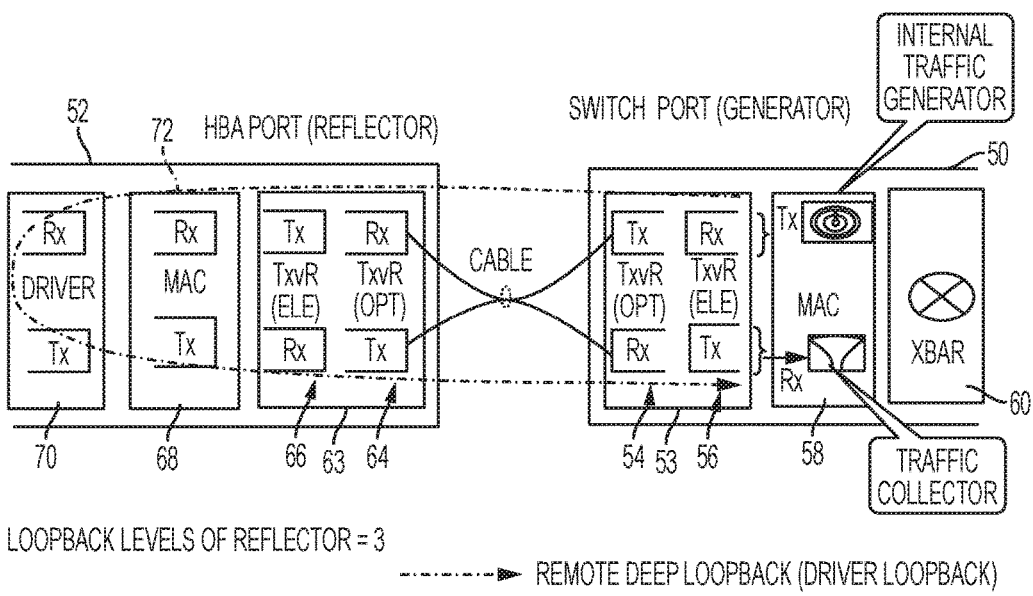
FIGS. 3A and 3B are pictorial representations of deep loopback capabilities for extended link diagnostics in FC SANs in accordance with certain embodiments described herein.

Turning to FIG. 1, FIG. 1 is a simplified block diagram illustrating a communication system 10 in which techniques for using frame deep loopback capabilities for extended link diagnostics in FC SANs in accordance with embodiments described herein may be implemented. In particular, FIG. 1 illustrates a SAN 12 comprising a switch 14 facilitating communication between an initiator 16 and a target 18 in SAN 12. Switch 14 includes a plurality of ports, for example, ports 20(1) and 20(2). A fixed function Fibre Channel ("FC") application specific integrated circuit ("ASIC") 22 facilitates switching operations within switch 14. As will be shown and described in greater detail below, and as best illustrated in FIG. 3A, an SFP (transceiver) of the HBA is connected to the SFP of the switch port via an optical cable. The SFP converts optical signal to an electrical signal and vice-versa as it performs Rx and Tx of the signal between the HBA and the switch. On the switch side, the electrical portion of the SFP interfaces with the MAC block on the switch port. In the Rx path on the switch port, signals are converted to frames in the MAC block and passed higher up to perform switching functions on the frame. The frame is then passed down to the destination port MAC block, where it is converted to an electrical signal and passed on to the SFP for Tx on the switch port.

Referring again to FIG. 1, Switch 14 may include a timer 23 for facilitating various timing operations of the switch 14. The switch 14 may further include a supervisor module 24 that hosts FC-2 layers and the protocols above. The software running on the supervisor implements the control plane functionality of the switch. A memory element 28 may represent a totality of all memory in switch 14. Note that in various embodiments, switch 14 may include a plurality of line cards with associated ports, each line card including a separate FC ASIC 22. The multiple line cards may be managed by a single supervisor module 24 in switch 14.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

FC is a high-speed serial interface technology that supports several higher layer protocols including Small Computer System Interface ("SCSI") and Internet Protocol ("IP"). FC is a gigabit speed networking technology primarily used in SANs. SANs include servers and storage (SAN devices being called nodes) interconnected via a network of SAN switches using FC protocol for transport of frames. The servers host applications that eventually initiate READ and WRITE operations (also called input/output ("I/O") operations) of data towards the storage. Nodes work within the provided FC topology to communicate with all other nodes. Before any IO operations can be executed, the nodes login to the SAN (e.g., through fabric login ("FLOGI") operations) and then to each other (e.g., through port login ("PLOGI") operations).

The data involved in I/O operations originate as Information Units ("IU") passed from an application to the transport protocol. The IUs are packaged into frames for transport in the underlying FC network. In a general sense, a frame is an indivisible IU that may contain data to record on disc or control information such as a SCSI command. Each frame comprises a string of transmission words containing data bytes.

Turning to the infrastructure of communication system 10, the network topology can include any number of initiators, targets, servers, hardware accelerators, virtual machines, switches (including distributed virtual switches), routers, and other nodes inter-connected to form a large and complex network. Network 12 represents a series of points or nodes of interconnected communication paths for receiving and transmitting packets and/or frames of information that are delivered to communication system 10. A node may be any electronic device, printer, hard disk drive, client, server, peer, service, application, or other object capable of sending, receiving, or forwarding information over communications channels in a network, for example, using FC and other such protocols. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Network 12 offers a communicative interface between targets (e.g., storage devices) 18 and/or initiators (e.g., hosts) 16, and may be any local area network ("LAN"), wireless local area network ("WLAN"), metropolitan area network ("MAN"), Intranet, Extranet, WAN, virtual private network ("VPN"), or any other appropriate architecture or system that facilitates communications in a network environment and can provide lossless service, for example, similar to (or according to) Fibre Channel over Ethernet ("FCoE") protocols. Network 12 may implement any suitable communication protocol for transmitting and receiving data packets within communication system 10. The architecture of the present disclosure may include a configuration capable of TCP/IP, FC, FCoE, and/or other communications for the electronic transmission or reception FC frames in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines ("DSL"), telephone lines, T1 lines, T3 lines, wireless, satellite, fiber optics, cable, Ethernet, etc. or any combination thereof) and/or through any additional networks such as a wide area networks (e.g., the Internet).

In various embodiments, switch 14 may comprise a Cisco® MDS™ series multilayer SAN switch. In some embodiments, switch 14 may be to provide line-rate ports based on a purpose-built "switch-on-a-chip" FC ASIC 22 with high performance, high density, and enterprise-class availability. The number of ports may be variable. In some embodiments, switch 14 may offer non-blocking architecture, with all ports operating at line rate concurrently.

In some embodiments, switch 14 may match switch-port performance to requirements of connected devices. For example, target-optimized ports may be configured to meet bandwidth demands of high-performance storage devices, servers, and Inter-Switch Links ("ISLs"). Switch 14 may be configured to include hot-swappable, Small Form-Factor Pluggable ("SFP"), LC interfaces. Individual ports can be configured with either short- or long-wavelength SFPs for connectivity up to 500 m and 10 km, respectively. Multiple switches can also be stacked to cost effectively offer increased port densities.

Multipath I/O is a fault-tolerance and performance enhancement technique that defines more than one physical path between a CPU in a computer system and its mass storage devices. As an example, two HBAs on the same server, or host, may connect to two FC ports on different switches. Should one controller, port, or switch fail, the OS can route the I/O through the remaining controller, port, or switch transparently and with no changes visible to the applications, other than perhaps increased latency for a short period of time. This re-routing is referred to herein as "path failover." Multipath software layers can leverage the redundant paths to provide performance-enhancing features, including load balancing, traffic shaping, automatic path management, and dynamic reconfiguration.

Figure 2:
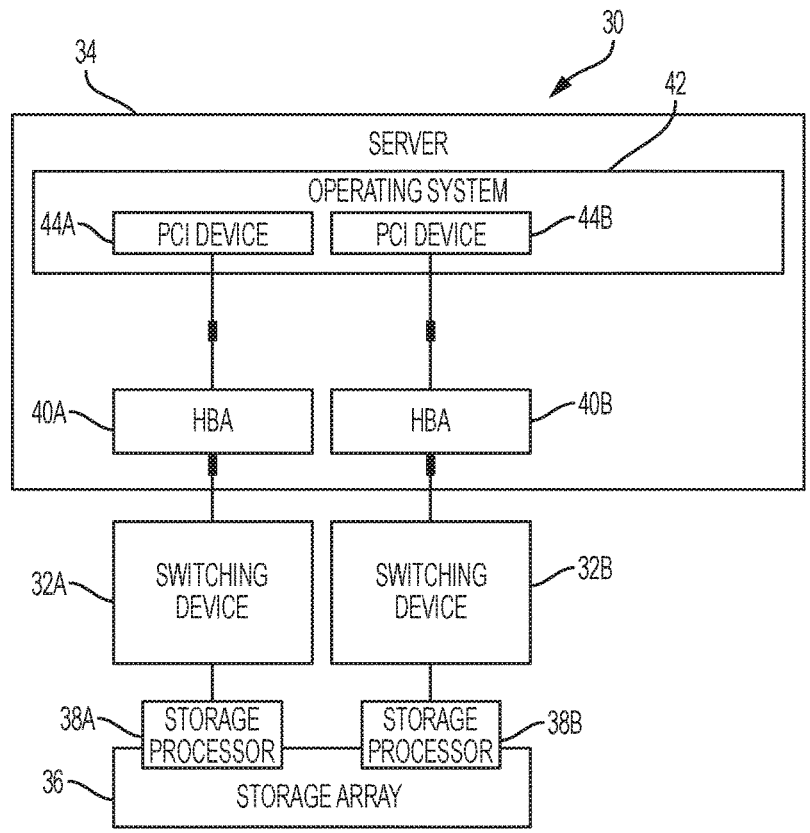
FIG. 2 is another simplified block diagram of a system in which techniques for using frame deep loopback capabilities for extended link diagnostics in FC SANs in accordance with embodiments described herein may be implemented.

Turning to FIG. 2, illustrated therein is a simplified block diagram of a system 30 in which techniques for using frame deep loopback capabilities for extended link diagnostics in FC SANs in accordance with embodiments described herein may be implemented. As shown in FIG. 2, the system 30 includes a pair of switching devices 32A, 32B, for connecting a server 34 to external storage devices arranged as a storage array 36.

In one embodiment, the storage array 36 includes a first storage processor 38A to which the server 34 is connected via the switch 32A, and a second storage processor 38B to which the server 34 is connected via the switch 32B. Each storage processor 38A, 38B, may comprise a dedicated network for providing access to consolidated data storage. In general, SANs make storage devices, such as disk arrays, for example, accessible to servers in a manner in which the storage devices appear to be logically attached to the server. The storage arrays may export/support logical unit numbers ("LUNs"). A LUN is a number used to identify a logical unit, which is a device addressed by the SCSI protocol or protocols that encapsulate SCSI, such as FC or iSCSI. SANs typically have their own network of storage devices that are generally not accessible by other devices through a local area network ("LAN").

In one embodiment, the system 30 is implemented in accordance with the Cisco Unified Computing System ("UCS") architecture developed by Cisco Systems, Inc., of San Jose, Calif. In general, UCS is data center platform that unites compute, network storage access, and virtualization into a single cohesive system designed to decrease implementation costs and increase agility. A fully redundant UCS system includes two independent fabric planes: Fabric A and Fabric B. The two switching devices 32A, 32B, are completely independent from the perspective of the data plane.

Cisco UCS can function with a single one of the switching devices if the other is offline or not provisioned. UCS uses a standards-based, low-latency, high-bandwidth 10Gb Ethernet and Fibre Channel over Ethernet ("FCoE") network for traffic, communications, and storage.

Referring again to FIG. 2, in accordance with features of one embodiment, the server 34 includes a pair of host bus adapters ("HBAs") 40A, 40B, each of which is exposed to an OS 42 of the server 34 as a PCI device 44A, 44B. In accordance with features of embodiments described herein, after a path failover is initiated by a host, the host is no longer sending I/O down the failed path via the port connected to the path, which presents headroom to run extended diagnostics on the port/path without having to contend with regular traffic. In addition to existing loopback tests like the electrical/optical loopback tests, Media Access Control ("MAC") loopback tests, a deep loopback test suite as described herein may be run to determine whether HBA issues beyond the MAC layer (i.e., at the software/firmware level) exist. A suite of tests including stress tests can be run, since some of the issues that cause packet drops will be exposed only when run at stress for an extended period of time and at higher traffic rates. In view of the foregoing, it is preferable to run the deep loopback test as a port offline test for a period lasting up to a few minutes. In case of deep loopback failures, the driver/OS can be upgraded and deep loopback test rerun so that the path is free of errors and ready for I/O traffic. Once the port is returned to operation, the host will recover the path. If path fallback policies are in place, the host will start to use the path (port) for regular I/O.

For cases in which multipath software is not present on the host, automatic failover is not possible. In such cases, interface error counters captured on the switch port should be monitored for link level errors observed. Additionally, for deep loopback testing, OS level I/O counters or switch forwarding/crossbar ASIC should be monitored. If supported, the T11 defined Read Diagnostic Parameters ("RDP") query can be issued by the switch port to the HBA to check any link level issues at its end. If any of the counters is seen to be increasing when monitored for a few cycles, link level diagnostics described herein need to be run. The only option available in this case would be to schedule a downtime on the link and perform diagnostic tests, including the deep loopback test, to identify the root cause of the problem. For ISL diagnostics cases, either a port monitoring action based intervention or a user intervention to bring down of the port is initiated so that diagnostics tests including deep loopback can be run. It is assumed that the ISLs are usually formed with a port channel; therefore, taking down one link for debugging should not greatly impact I/O.

As illustrated above, servers connect to FC SANs through one or more HBAs. An HBA functions as an N port and performs a login to FC fabric ("FLOGI"), sourcing I/O operations on behalf of the server into the fabric. The FC fabric connectivity between the HBA and switch fabric consists of several electrical and optical components. If any one of these components is faulty, I/O operations of the server over the FC fabric may be impacted. Today FC is deployed in mission critical networks, where five 9s resiliency and throughput is a requirement.

Although certain embodiments herein are described with reference to a switch F port and its connected HBA N port, the techniques are also applicable to any two directly connected FC peer ports that maintain bidirectional communication (E port/ISL links). At a high level, embodiments described herein involve the two ends of the link first performing a handshake using a vendor specific Extended Link Service ("ELS") command and then entering a "Link Diagnostic" mode. A master/slave relationship driven through a configuration is established. Once in Link Diagnostic mode, regular FC port operations are suspended and the master port sends test traffic comprising special FC frames at high rates to be looped back at various checkpoints involving different components from the peer port. A check on the number of sent frames and received loopback frames at the master port verifies the health of all components involved in the bidirectional link path. In case of failures, the checkpoint at which the test fails will indicate possible components that could be the reason for the failure.

As will be described in greater detail below, in certain embodiments, FC cable length and latency may be measured using the capability of port ASICs to generate a 1588 Pong frame with accurate hardware based time stamping. These frames are expected to be looped back from the peer port. By comparing the sent and received timestamps the frame latency introduced by various components and length of the cable can be determined.

As used herein, the following terms have the following meanings:

1. Generator Port: An FC port in link diagnostic mode that is sourcing test traffic. For a port to be able to work in generator mode it should be able to:
   a) generate FC frames from within the port hardware at different rates, lengths, payload, etc., without any external support;
   b) count number of good and bad frames Tx/Rx from the port and detect malformed frame content; and
   c) support link diagnostic mode generator functionality.
2. Reflector Port: An FC port in link diagnostic mode that can unconditionally loop back all traffic received by it. For a port to be able to work in reflector mode it should be able to:
   a) enable and disable its components from the frame loopback mode as driven by the link diagnostic mode protocol. Generally, there is no need to lookup frame content and it can just do a bit-by-bit loopback of the signal on the link; and
   b) auto-reset out of loopback mode on detection of a Signal Loss/Laser Off condition from the peer link.
3. Loopback Depth: Various sub-components that make up the reflector port have the capability to loopback frames. Every such sub-component is considered a loopback level. The total count of such sub-components that can be independently set into loopback mode is the Loopback Depth. The following loopback levels are generally supported:
   a) Transceiver Optical Loopback;
   b) Transceiver Electrical loopback;
   c) MAC Loopback; and
   d) Deep Loopback.

As will be described in greater detail herein, a deep loopback is a frame loopback at the deepest possible location in the frame I/O path (FC-2 or above layer). If the reflector port is the HBA, this functionality is usually implemented in the FC I/O driver running on the server CPU. If the reflector port is the switch, this functionality could be implemented by looping back in the switching crossbar ASIC (data path) or in the inband, or FC-2 layer, driver (control path). The frame is usually parseable before performing a loopback.

All loopbacks performed on the reflector port are classified as remote loopback. The generator port itself could perform a frame loopback from its Tx path into the Rx path, which is referred to as a local loopback. Supporting all four loopback levels in a reflector is not mandatory. As discussed hereinbelow, embodiments described herein include a mechanism for the reflector to indicate which levels are supported.

FIG. 3A illustrates a pictorial representation of the deep loopback level listed above. In the example illustrated in FIG. 3A, a switch port 50 functions as the generator and an HBA port 52 functions as the reflector. The switch port 50 includes an SFP 53 including an optical transceiver element 54, an electrical transceiver element 56, a MAC element 58, and a crossbar element 60. The HBA port 52 includes an SFP 63 including optical transceiver element 64, an electrical transceiver element 66, a MAC element 68, and a driver 70. As shown in FIG. 3A, a remote deep loopback (or driver loopback), is represented by an arrow designated by a reference numeral 72.

Figure 3B:
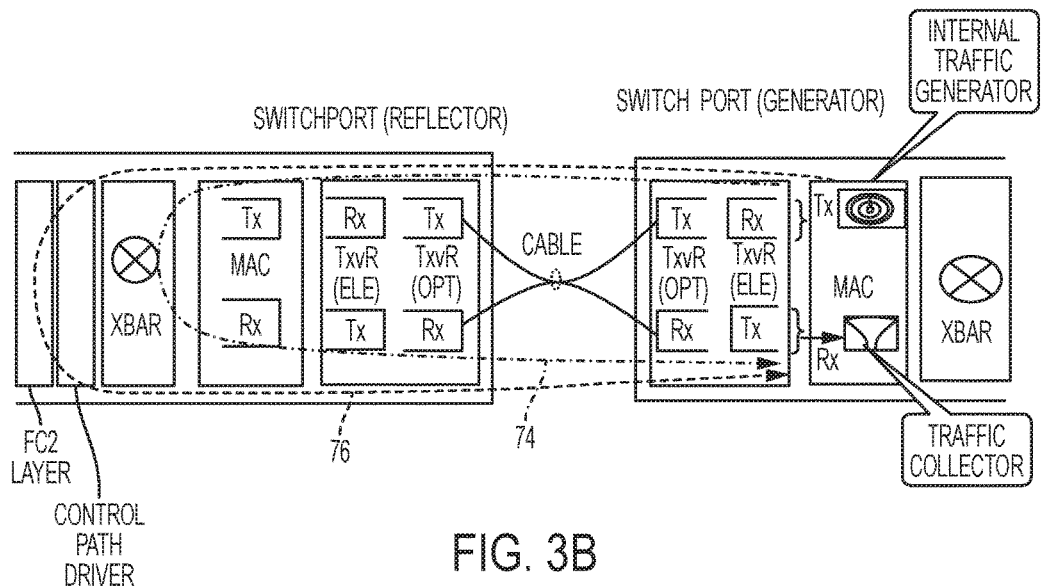

FIG. 3B illustrates a pictorial representation of a deep loopback in a case in which both the reflector and the generator are switch ports. An arrow designated by a reference numeral 74 represents a data path deep loopback, while an arrow designated by a reference numeral 76 represents a control path deep loopback.

A traffic generator on a switch MAC is used to generate loopback test traffic with different FC frame sizes and at up to 100% of the traffic rate of the port. Frames reflected back are verified by collector logic for correctness and to determine whether all sent frames are received back unchanged.

Many of the performance issues that occur with a specific host/application result from issues in the edge HBA port (N port) or switch port (F port) because a multitude of combinations of server OSes, HBAs, and target devices with different versions of software running on them are involved. While these issues are possible on the ISL ports, which can impact all devices in the SAN, the probability of it is quite low.

Figure 4:
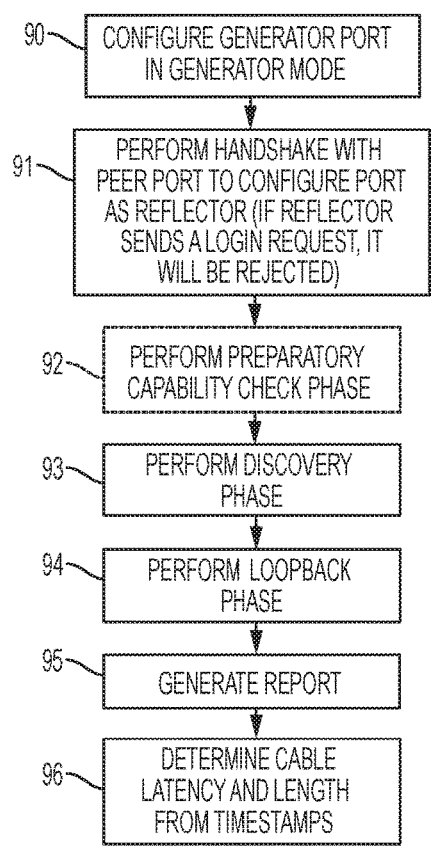
FIG. 4 is a simplified flowchart illustrating example operations that may be performed in connection with techniques for using frame deep loopback capabilities for extended link diagnostics in FC SANs in accordance with embodiments described herein.

Referring now to FIG. 4, illustrated therein is a high-level, simplified flowchart of embodiments described herein. In one embodiment, a proprietary link diagnostic protocol may be used to coordinate performance loopback tests between a generator and a reflector port to verify and isolate connectivity faults. In step 90, generator mode is configured on the designated generator port as a first step toward beginning diagnostic mode testing. A simple mode configuration of the port sets the mode to link diagnostic generator. In step 91, the generator initiates the link diagnostic mode protocol handshake with the peer port to force it into a reflector mode. It will be noted that if the reflector sends a login request ("FLOGI"), it is rejected with an LS_RJT message. During the handshake, the reflector negotiates diagnostic mode parameters with the generator. The overall diagnostic mode test contains two phases: discovery phase (Phase 1), and loopback phase (Phase 2). An optional preparatory capability check phase (Phase 0) may be initiated independently of the other two phases.

Before a port can be configured into link diagnostic mode, it is critical to know whether the peer port is able to support the link diagnostic mode protocol. The optional preparatory capability check phase (Phase 0) may be used for this purpose (step 92). In response to a command sent by the generator, the peer port indicates whether it supports the link diagnostic mode protocol, along with port generator/reflector capabilities. An attempt to configure diagnostics mode on ports where the capability check indicates that the port does not include those capabilities results in a configuration error.

During the discovery phase (Phase 1), the roles and loopback capabilities of the two ends of the link are determined (step 93). During the loopback phase (Phase 2), the actual loopback tests are performed with traffic and the overall health of the connection is determined (step 94). All supported loopback tests may be performed during this phase. This phase can be entered only after the discovery phase has successfully completed and the generator and reflector ports are in operationally "Up" state. A typical loopback test between a switch port and HBA may proceed as follows:

Stage 1: HBA Deep (FC Driver) Remote Loopback.
Stage 2: HBA MAC Remote Loopback.
Stage 3: HBA Transceiver Optical Remote Loopback.
Stage 4: Switch port Transceiver Electrical Loopback and Deep Local Loopback.

In certain embodiments, the farthest loopback supported may be attempted first so that initial time is spent in test of the end-end connection involving all the components. This way faulty segments in the connection are identified as quickly as possible. If the farthest loopback stage test succeeds, all lower level loopbacks are also most likely to succeed. Alternatively, loopback tests may proceed in the reverse order, with testing being halted when a current test fails, indicating a faulty segment has been located.

The actual content of the frames sent during the test is generator port implementation specific. The reflector typically does not care about it since it should be working mostly in a signal loopback mode. Since all normal switch port operations stand suspended there are no restrictions on bandwidth consumption on the port and shall be tested for Line Rate (100%) traffic by default. Loopback latency and cable length measurements using packet probes is also done in this stage as discussed in greater detail below. At the end of loopback test for every level, the generator port generates a "Laser Off" condition, which causes a "Signal Loss" condition at the reflector port and acts as an indicator for it to reset the loopback mode and marks end of the loopback level of the test. The generator then initiates a "Laser On" event followed by a normal link bring up. After the Link Up, if more levels are to be tested as negotiated in discovery phase, the next stage of the loopback test is executed until all of the stages are complete. After all stages are complete, a final link reset and Link Up are attempted and the port continues to remain in link diagnostic mode in the Up state.

If in any of the test stages the generator port does not receive back any of the frames it sends out or receives back any of the frames with errors, the test is considered a failure and a connectivity fault is recorded for that stage (step 95). In one embodiment, a CLI instruction may be used to initiate a display of the last link diagnostic phase results with details like number of frames sent, received, CRC errors, code violation errors, etc. Test stages that failed are also part of the output along with possible reasons why the specific test failed (e.g., faulty HBA, faulty transceiver, faulty cable, etc.). Another CLI instruction may be used to initiate a display of the status of the last executed test, e.g., how many frames are yet to be sent, how many test stages have been completed, how many test stages are pending, etc.), along with timestamps. The loopback phase may be run repeatedly by performing a "start" operation on the port to check for consistency in faults being reported. The faulty hardware identified can be replaced and the test repeated once again to verify if it passes and the faulty component has been isolated. Test failure at the deep loopback stage can be due to various reasons, such as software bugs in the FC driver (packet descriptor leaks) or any lower level loopback failures.

When test traffic is initiated from the switch port (F port) towards the HBA port (N port), the internal traffic generation capabilities inherent in certain FC ASICs may be used. The diagnostic test phase runs a series of loopback tests, such as SFP electrical/optical loopbacks and MAC loopbacks, comparing number of frames sent and received. When these loopback tests succeed, a deep loopback test, such as described herein, may be run to expose issues in software in the driver/OS.

It will be recognized that the SFP and MAC loopback tests are signal level loopbacks that loopback the signal as-is without the notion of a frame. In contrast, the deep loopback test will conduct a frame level loopback. The frames will be generated with a vendor-specific R_CTL field of 0xf4 so that a loopback decision can be made by looking at only the R_CTL value in the FC header of the frame alone. The domain-controller address (0xfffffd) is used in SID/DID of the frame.

When the HBA is the reflector port, deep loopback may be implemented in the HBA FC driver where packet descriptors are allocated and freed as part of passing the frames to the host stack. At the driver level, packets can be parsed and packet header R_CTL contents looked up to determine whether a frame needs to be looped back. The deep loopback could also be implemented further up in the host storage stack as a separate I/O loopback path based on information passed from the driver to the host stack in an implementation specific manner. Because the deep loopback is a frame level loopback, it is expected to hit areas in the I/O path that traverse logic blocks beyond the HBA MAC layer. Typical issues exposed by this level loopback include crashed/unresponsive driver software, packet descriptor memory/data structures corruption, FC driver memory leaks in the I/O path, large buffer transfer/receive processing hitting boundary conditions, frame DMA memory corrupting frames due to handling a sudden I/O burst etc. To cover all these areas as part of deep loopback, a suite of tests like min/max/random/specific size frames, specific payload patterns, combination of specific SCSI commands known to have caused issues in the past, for example, will be run to ensure that the driver is handling all these types of frames and looping it back as-is. A frame pattern with continuously increasing exchange IDs can test the I/O queue management of the driver code. For some HBAs, queue depths exceeding a certain number is known to hang the system, which works perfectly until this limit is hit. Some of the field reported issues for which the root cause has been well understood can be added into the deep loopback suite of tests on an ongoing basis. A report generated at the end of the test indicates which specific suite of deep loopback test failed and what frame pattern saw the loss of frames and possible remedial action to fix the issue.

Figure 5A:
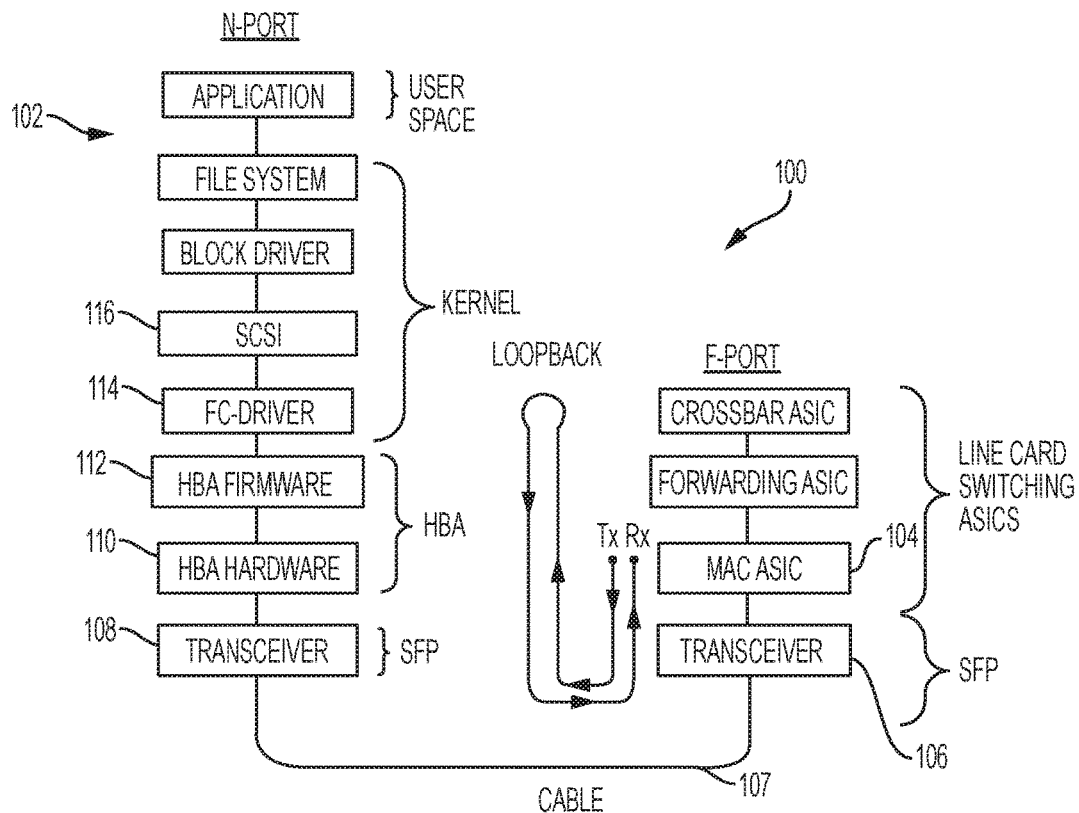
FIG. 5A is a simplified block diagram illustrating implementation of frame deep loopback capabilities for extended link diagnostics in FC SANs in accordance with embodiments described herein in cases in which a switch port functions as a generator and an HBA port functions as a reflector.

FIG. 5A illustrates deep loopback testing in accordance with embodiments described herein in which a switch port (F port) 100 functions as the generator and an HBA port (N port) 102 functions as the reflector. As shown in FIG. 5A, the deep loopback test frames are initiated at a MAC ASIC 104 of the F port 100, proceeds through a transceiver 106, across a cable 107, and traverses a transceiver 108, HBA hardware 110, HBA firmware 112, and are looped back at an FC driver 114 of the N port 102 (just prior to an FC SCSI element 116).

Figure 5B:
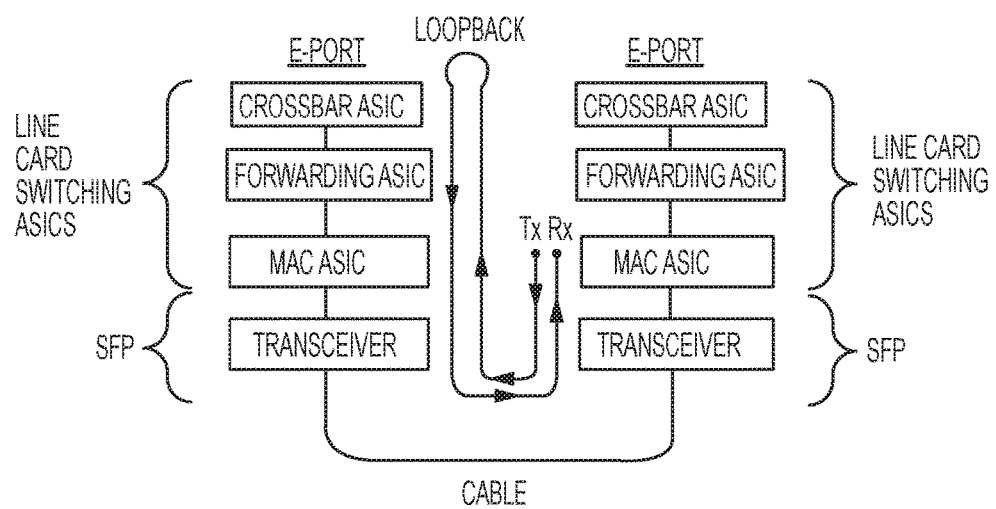
FIG. 5B is a simplified block diagram illustrating implementation of frame deep loopback capabilities in a data path for extended link diagnostics in FC SANs in accordance with embodiments described herein in cases in which a switch functions as a generator and another switch port functions as a reflector.
Figure 5C:
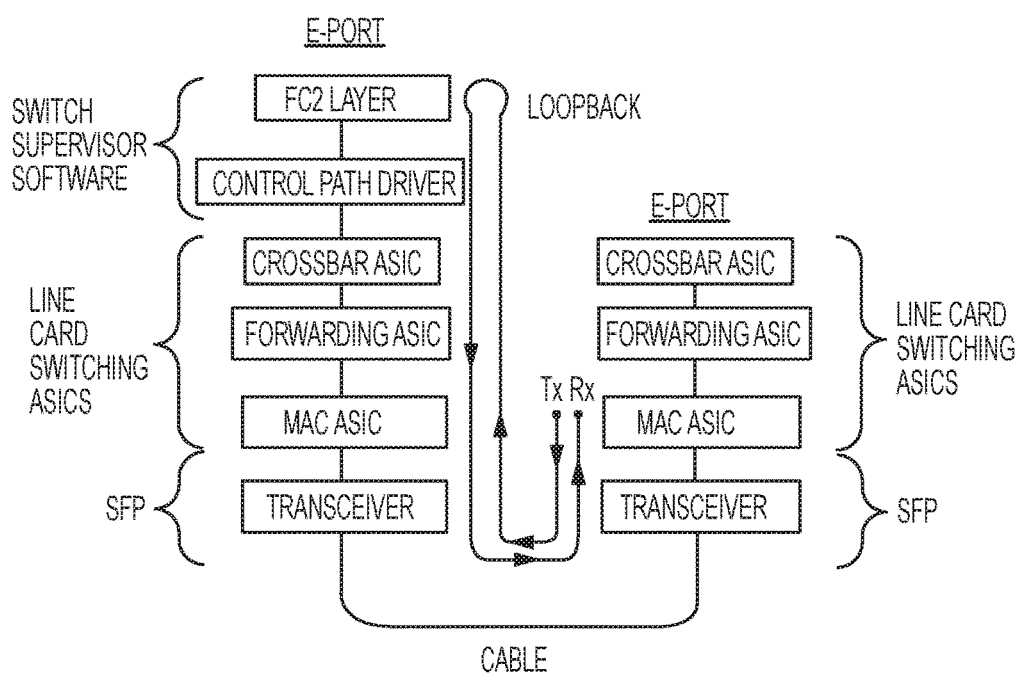
FIG. 5C is a simplified block diagram illustrating implementation of an alternative set of frame deep loopback capabilities in a control path for extended link diagnostics in FC SANs in accordance with embodiments described herein in cases in which a switch port functions as a generator and another switch port functions as a reflector.

In cases in which the switch is in the role of reflector port and either an HBA or another switch port is in the role of the generator port, on the switch side deep loopback can be made to either loopback in the data path (FIG. 5B) or the control path (FIG. 5C) inside the switch. The data path is the SCSI frame I/O path, while control path is where Login request and name server queries from the HBA are destined. In the data path loopback, incorrect crossbar ASIC programming, faulty crossbar fabric ASICs, ECC errors in memory access to off-chip memories while frames undergo a forwarding lookup, and others, can cause corrupted frames. In the control path software, bugs in the inband driver, bugs in the kernel socket management, the FC-2 layer packet descriptor corruption, switch CPU hogs causing slow control frame processing, and others, may cause frame drops. Deep loopback tests ensure frames traverse all these paths.

Data path loopback on a switch port can be achieved by programming ACLs on the ingress port forwarding logic that will match on the FC header R_CTL field contents (RCTL_content=0xf4) and sets the Destination Index ("DI") of the frame to same as the Source Index ("SI"). The ACL result is marked to have a priority over the FIB result so that the frame does not hit the regular forwarding path. The ACL can be programmed to markdown priority so that these frames don't impact regular frame switching from other ports within the switch fabric. These test frames travel until they reach the crossbar fabric and are routed back to the same port on which the packets came in, thus achieving loopback. A control path loopback is performed in the FC-2 layer of the FC stack running on the supervisor. The WKA 0xfffffd in the DID of the diagnostic frame will cause the frame to be redirected to the control path towards the supervisor. The FC2 layer can look at the R_CTL field of the frame and index direct the packet back to the same ingress port by setting DI of the frame same as the SI and transferring the frame into the transmit path of FC2. Control path loopback test frames use a different vendor specific R_CTL value of 0xf5 so as not to match the ACL for the data path loopback.

When performing a loopback either at the HBA driver or in the FC2 layer of the switch control path, the rate at which software is able to perform the frame loopback can vary across implementations. To cater to this, the Link Diagnostic Protocol Discovery phase has a provision to indicate both the B2B credit setting on the link and the maximum packet rate (in frames/second) that the generating port can send when performing the test. This ensures the reflector port is not overwhelmed during the deep loopback test.

Since deep loopback is a frame level loopback, it can be extended across multiple switch hops as well. By setting a DID of the destination port domain controller (0xFFFCxx), the frame can be looked up via an ACL at the destination switch (domain), SID and DID swapped, and looped back at the crossbar of that switch thereby providing for a multi-hop deep loopback data path test.

Figure 6A:
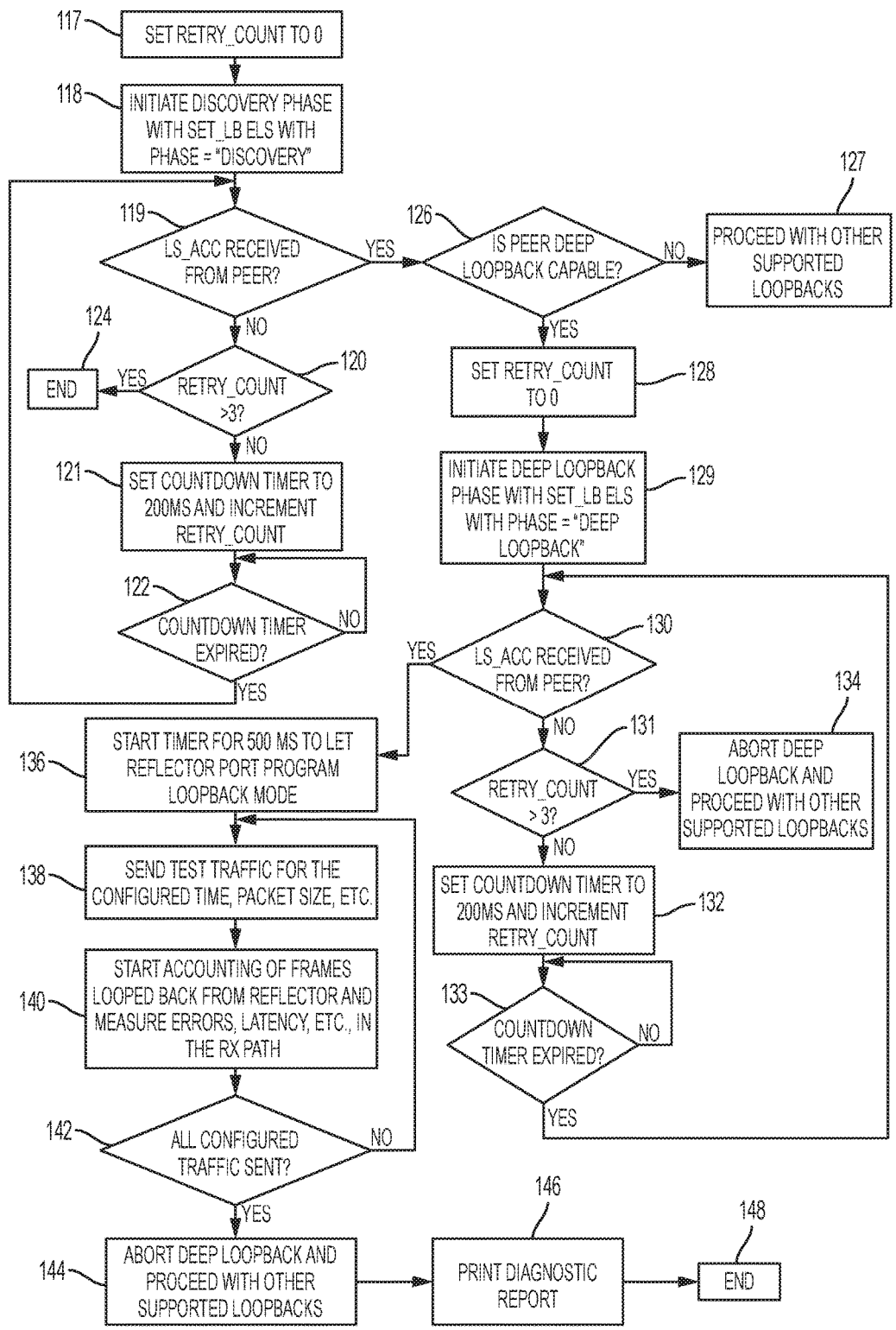
FIG. 6A is a flowchart illustrating operational steps that may be performed at a generator port for enabling deep loopback techniques in accordance with embodiments described herein.

FIG. 6A is a flowchart of operational steps that may be performed at a generator port for enabling deep loopback techniques in accordance with embodiments described herein. In step 117, a variable RETRY_COUNT is set to zero. In step 118, a discovery phase is initiated by sending a Proprietary Set Loopback ("SET_LB") ELS message with phase="DISCOVERY" to a peer at the other end of the link to be tested. In step 119, a determination is made whether an LS_ACC message has been received from the peer, indicating that the link service has been accepted. If not, execution proceeds to step 120, in which a determination is made whether the value of RETRY_COUNT is greater than 3. If a negative determination is made in step 120, execution proceeds to step 121, in which a countdown timer is set to 200 ms and the value of RETRY_COUNT is incremented by one. Execution then proceeds to step 122, in which a determination is made whether the countdown timer has expired. Execution remains at step 122 until the countdown timer expires, at which point execution returns to step 119. If a positive determination is made in step 120, execution terminates in step 124.

If an LS_ACC has been received from the peer in step 119, execution proceeds to step 126. In step 126, a determination is made whether the peer is deep loopback capable. If not, execution proceeds to step 127, in which the other supported loopback tests are run. If it is determined in step 126 that the peer is deep loopback capable, execution proceeds to step 128, in which the variable RETRY_COUNT is set to zero. In step 129, a SET_LB ELS message with phase="DEEP LOOPBACK" is sent to the peer to initiate the deep loopback test. In step 130, a determination is made whether an LS_ACC message has been received from the peer. If an LS_ACC message has not been received from the peer, execution proceeds to step 131, in which a determination is made whether the value of RETRY_COUNT is greater than 3. If a negative determination is made in step 131, execution proceeds to step 132, in which the countdown timer is set to 200 ms and the value of RETRY_COUNT is incremented by one. Execution then proceeds to step 133, in which a determination is made whether the countdown timer has expired. Execution remains at step 133 until the countdown timer expires, at which point execution returns to step 130.

If a positive determination is made in step 131, execution proceeds to step 134, in which the deep loopback test is aborted and the other supported loopback tests are run. If in step 130 it is determined that an LS_ACC message has been received from the peer, execution proceeds to step 136, in which a countdown timer is set for a predetermined time period (e.g., 500 ms) to allow for the peer (or "reflector") port to program the deep loopback mode. In step 138, test traffic is sent for the configured time, packet size, etc. In step 140, an accounting of frames looped back from the reflector port is performed and errors, latency, etc., in the receive path are measured. In step 143, a determination is made whether all configured traffic has been sent. If not, execution returns to step 138; otherwise, execution proceeds to step 144. In step 144, a diagnostic report may be printed and in step 146, a Laser OFF is initiated to reset the link to proceed with other diagnostic tests. Execution terminates in step 148.

Figure 6B:
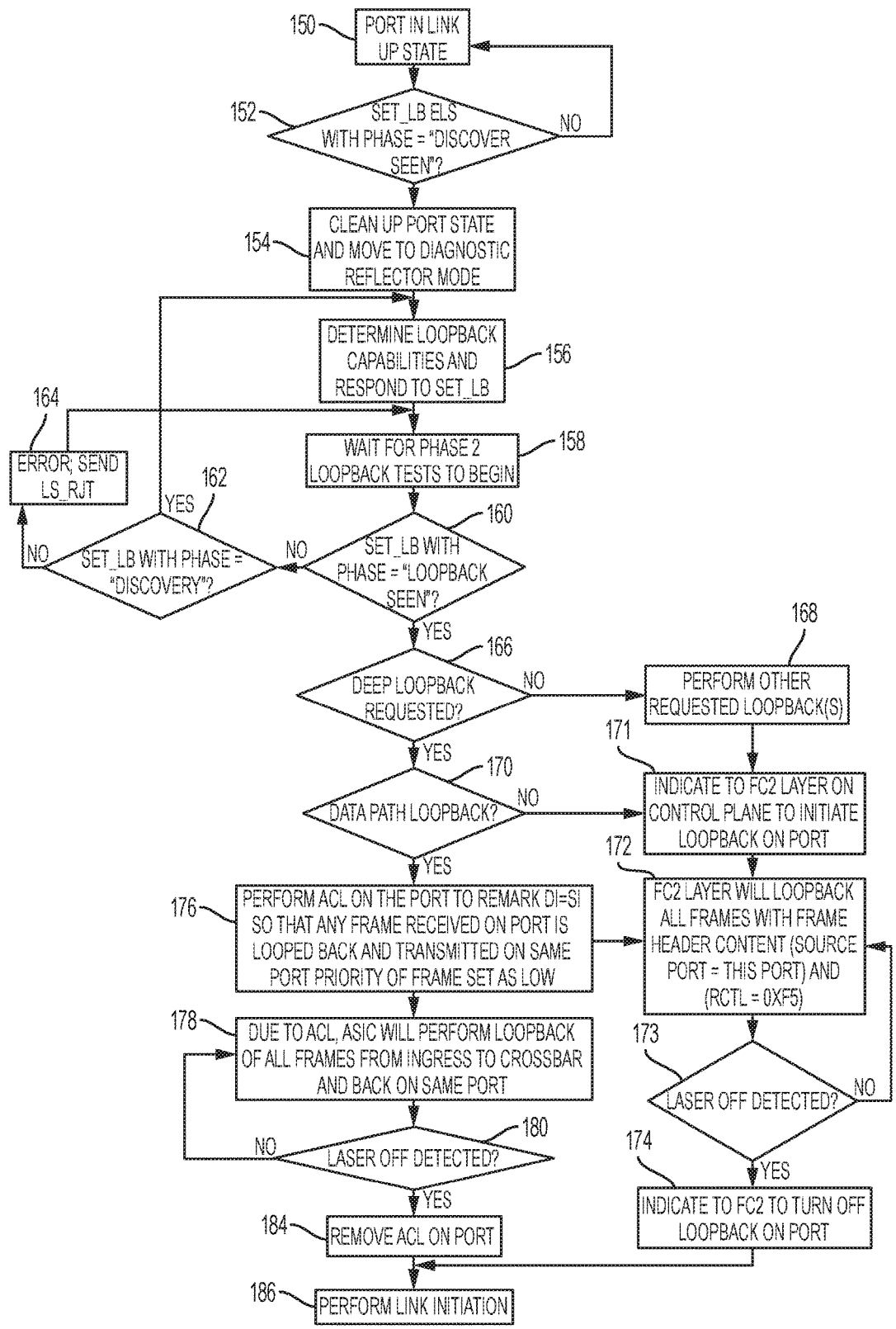
FIG. 6B is a flowchart of operational steps that may be performed at a switch port functioning as a reflector port for enabling deep loopback techniques in accordance with embodiments described herein.

FIG. 6B is a flowchart of operational steps that may be performed at a switch port functioning as a reflector port for enabling deep loopback techniques in accordance with embodiments described herein. In step 150, the port is placed in Link Up state. In step 152, a determination is made whether a SET_LB ELS message with phase="DISCOVERY" has been received on the link (from the generator port). If not, execution returns to step 150; otherwise, execution proceeds to step 154, in which the port state is cleaned up and the port is placed in Diagnostic Reflector mode. In step 156, loopback capabilities of the port (e.g., SFP loopback capabilities, MAC loopback capabilities, and control/data plane deep loopback capabilities) are determined and a response to the SET_LB ELS message is sent to the generator. In step 158, the port awaits phase 2 loopback testing to begin. In step 160, a determination is made whether a SET_LB ELS message with phase="LOOPBACK" has been received. If not, execution proceeds to step 162, in which a determination is made whether a SET_LB ELS message with phase="DISCOVERY" has been received. If not, execution proceeds to step 164, in which an error is detected and an LS_RJT message is sent, and then returns to step 158. If a positive determination is made in step 162, execution returns to step 156.

If a positive determination is made in step 160, execution proceeds to step 166, in which a determination is made whether deep loopback testing has been requested. If not, execution proceeds to step 168, in which other requested loopback testing is performed, and then returns to step 160. If a positive determination is made in step 166, execution proceeds to step 170, in which a determination is made whether data path loopback testing has been requested. If not, execution proceeds to step 171, which an indication is provided to FC-2 layer thon the control plane to initiate loopback on the port. In step 172, FC-2 layer will loopback all frames with frame header content (Source Port=this port) and (RCTL=0xF5). In step 173, a determination is made whether a Laser Off condition has been detected. If not, execution returns to step 172; otherwise, execution proceeds to step 174, in which an indication is provided to FC-2 to turn off loopback on the port.

If a positive determination is made in step 170, execution proceeds to step 176. In step 176, ACL is programmed on the reflector port to remark DI=SI so that any frame received on the port is looped back and transmitted on the same port. Additionally, the priority of such frames is set to low. In step 178, due to ACL, the ASIC will perform loopback of all frames from the ingress to crossbar and back out the same port. Execution then proceeds to step 180. Similarly, upon completion of step 174, execution proceeds to step 180.

In step 180, a determination is made whether a Laser Off condition has been detected. If not, execution returns to step 178. If it is determined in step 180 that a Laser Off condition has been detected, execution proceeds to step 184, in which ACL is removed on the port in the data plane. Upon completion of step 174 or 184, execution proceeds to step 186, in which a link initiation is performed.

Precision Time Protocol ("PTP") is an IEEE 1588 defined protocol that exchanges packets containing a time stamp that represents the current time to which the clock of the receiving device needs to be adjusted. The synchronization is achieved through a series of messages exchanged between master and slave clocks. PTP is used in context of link diagnostics as described herein for a different purpose. A 1588 PTP protocol frame, which carries an ASIC timestamp in the frame payload, can be generated and encapsulated within an FC frame and used for the deep loopback test. The sending port can calculate the path latency based on the sent and received timestamps in either the control or data path. This value can be used to generate a health metric of the path and presented in the deep loopback diagnostic report. This is useful in cases in which there are no frame drops, but slowness in frame processing in the path is detected (FIG. 4, step 96).

Figure 7:
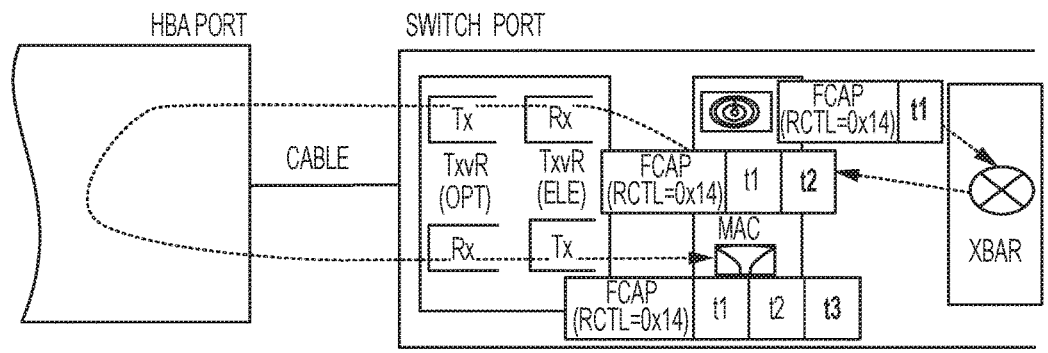
FIG. 7 is a simplified block diagram illustrating implementation of frame deep loopback capabilities for extended link diagnostics in FC SANs in accordance with embodiments described herein for determining cable latency and length.

In particular, a PTP frame may be generated from the switch ingress port MAC with an ASIC clock timestamp as t1. This frame has a special R_CTL value and FC_TYPE that causes the frame forwarding logic to pick the outgoing interface as the same port from where it originated. While egressing the port, the packet is again timestamped, this time as t2. This frame is sent to the peer port, which can be another switch port or an HBA, where the frame is looped back. When received back at the sending port, the frame is again timestamped, this time as t3. All the timestamps t1, t2, t3 are put into a hardware FIFO and can be read by software, which uses these timestamps to determine switch internal loopback latency as (t2-t1) and round trip bidirectional latency as (t3-t2). FIG. 7 is a representation of the timestamp recording scheme described above.

In accordance with features of embodiments described herein, there are several cases in which PTP and loopback functionalities are used at the generator, including (1) cable latency and length measurement; (2) incremental frame latency introduced at every component of the reflector; and (3) continuous monitoring of latency on operational links. Cable length can be calculated once cable latency is measured. It can be accurately measured if the frame can be looped back at the reflector closest to the cable. Accordingly, during link diagnostic mode remote loopback phase as part of transceiver optical loopback traffic test, a latency probe PTP packet may be sent. With the timestamps collected by this frame, cable latency can be determined. This length of the cable is then calculated as (cable latency÷speed of light).

Component latencies can be determined as follows. During the link diagnostic mode tests, latency probe packets are sent at every loopback test stage before actual traffic test starts. Assuming using this procedure, the latencies are determined to be as follows: (1) transceiver loopback latency=L1; (2) MAC loopback latency=L2; (3) deep loopback latency=L3. From this we can determine reflector component introduced latencies as transceiver latency=(L2-L1) and MAC latency=(L3-L2).

Constant monitoring of packet round trip time ("RTT") latency can be configured on any type of port (E/F) that is in operationally "Up" state. In case of F ports where the peer is an HBA, the only requirement is that frames received with SID=DID=0xffffffd, FC-Type=0x5(IP) and R_CTL=0xf4 (vendor specific) are looped back (deep loopback) on the same port without any changes. These PTP frames to monitor RTT are be generated and paced so as not to consume more than 1 B2B credit on the port. If the deep loopback latency value (L3) is determined during link diagnostic tests on the port can act as a baseline for checking degradation in latency values and can be provided to the administrator before it results in a chronic issue. This functionality is enabled only on healthy ports, where frame latency can be trended and degradation can be detected before it impacts port performance. On ports that are already in low credit mode due to a slow device, etc., the monitoring is automatically turned off as it can only aggravate the issue. An FC interface level configuration command to enable RTT monitoring port may be provided.

Even though frame drops are not as impactful as in FC networks, the same mechanism can be easily extended for Ethernet links as well for testing with both end devices (NICs) or links between switches and identifying the faulty components.

Embodiments described herein enable the health of the I/O path inside an HBA to be checked end to end (up to the host storage stack) in both directions from the connected switch port. Embodiments described herein also enable the health of the switch port internal control path to be checked from the connected HBA. Additionally, embodiments described herein enable the health of the switch port internal fabric data path (I/O path) to be checked end to end (up to the crossbar fabric of the switch) from the connected HBA and the health of the end-to-end fabric data path across switches between two device domains to be initiated from the source domain switch ISL port. Moreover, embodiments described herein enable the health of control and data path of a peer switch port across an ISL to be checked and help prevent escalations to support staff by providing quick diagnostic reports to the SAN admin through constant updating of deep loopback tests based on issues reported from the field.

Figure 8:
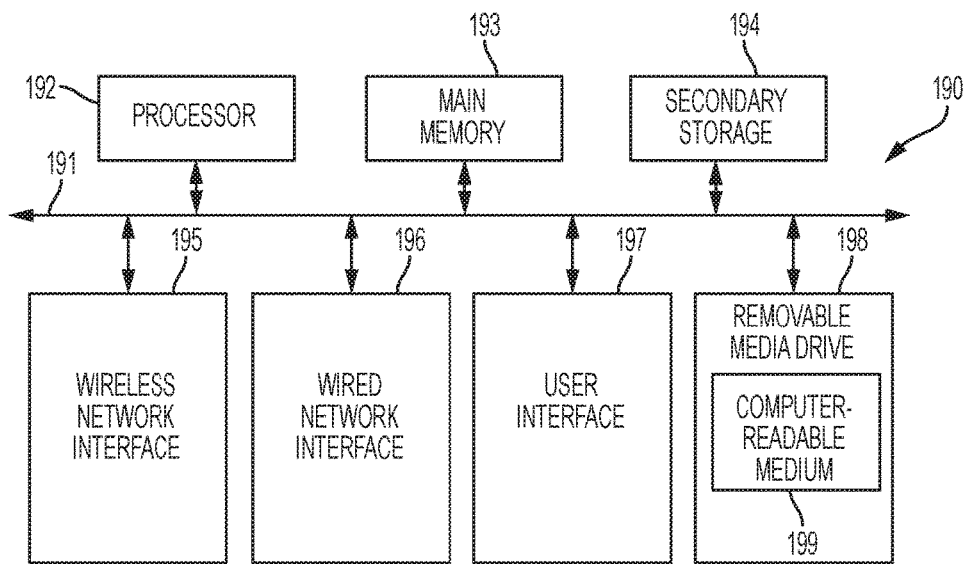
FIG. 8 is a simplified block diagram of a machine comprising an element of a communications network according to one or more examples of embodiments described herein.

Turning to FIG. 8, FIG. 8 illustrates a simplified block diagram of an example machine (or apparatus) 190, which in certain embodiments may be a server or a switch, that may be implemented in embodiments described herein. The example machine 190 corresponds to network elements and computing devices that may be deployed in a communications network. In particular, FIG. 8 illustrates a block diagram representation of an example form of a machine within which software and hardware cause machine 190 to perform any one or more of the activities or operations discussed herein. As shown in FIG. 8, machine 190 may include a processor 192, a main memory 193, secondary storage 194, a wireless network interface 195, a wired network interface 196, a user interface 197, and a removable media drive 198 including a computer-readable medium 199. A bus 191, such as a system bus and a memory bus, may provide electronic communication between processor 192 and the memory, drives, interfaces, and other components of machine 190.

Processor 192, which may also be referred to as a central processing unit ("CPU"), can include any general or special-purpose processor capable of executing machine readable instructions and performing operations on data as instructed by the machine-readable instructions. Main memory 193 may be directly accessible to processor 192 for accessing machine instructions and may be in the form of random access memory ("RAM") or any type of dynamic storage (e.g., dynamic random access memory ("DRAM")). Secondary storage 194 can be any non-volatile memory such as a hard disk, which is capable of storing electronic data including executable software files. Externally stored electronic data may be provided to computer 190 through one or more removable media drives 198, which may be configured to receive any type of external media such as compact discs ("CDs"), digital video discs ("DVDs"), flash drives, external hard drives, etc.

Wireless and wired network interfaces 195 and 196 can be provided to enable electronic communication between machine 190 and other machines, or nodes. In one example, wireless network interface 195 could include a wireless network controller ("WNIC") with suitable transmitting and receiving components, such as transceivers, for wirelessly communicating within a network. Wired network interface 196 can enable machine 190 to physically connect to a network by a wire line such as an Ethernet cable. Both wireless and wired network interfaces 195 and 196 may be configured to facilitate communications using suitable communication protocols such as, for example, Internet Protocol Suite ("TCP/IP"). Machine 190 is shown with both wireless and wired network interfaces 195 and 196 for illustrative purposes only. While one or more wireless and hardwire interfaces may be provided in machine 190, or externally connected to machine 190, only one connection option is needed to enable connection of machine 190 to a network.

A user interface 197 may be provided in some machines to allow a user to interact with the machine 190. User interface 197 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 198 represents a drive configured to receive any type of external computer-readable media (e.g., computer-readable medium 199). Instructions embodying the activities or functions described herein may be stored on one or more external computer-readable media. Additionally, such instructions may also, or alternatively, reside at least partially within a memory element (e.g., in main memory 193 or cache memory of processor 192) of machine 190 during execution, or within a non-volatile memory element (e.g., secondary storage 194) of machine 190. Accordingly, other memory elements of machine 190 also constitute computer-readable media. Thus, "computer-readable medium" is meant to include any medium that is capable of storing instructions for execution by machine 190 that cause the machine to perform any one or more of the activities disclosed herein.

Not shown in FIG. 8 is additional hardware that may be suitably coupled to processor 192 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 190 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 190 to appropriately manage the operation of the hardware components therein.

The elements, shown and/or described with reference to machine 190, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 193, secondary storage 194, computer-readable medium 199) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 192) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   configuring a first network element of a fibre channel ("FC") network as a generator element, wherein the generator employs a link diagnostic protocol to cause a second network element comprising a peer of the first network element as a reflector element, wherein the first network element and the second network element are connected via a link;
   entering a first diagnostic phase, wherein in the first diagnostic phase, diagnostic capabilities of the first network element and the second network element are determined; and
   subsequent to completion of the first diagnostic phase, entering a second diagnostic phase in which a deep loopback test is performed, wherein the deep loopback test comprises a frame level loopback test for exposing an issue in a path between the first network element and the second network element beyond a Media Access Control ("MAC") layer, wherein frames of the deep loopback test are looped back at a crossbar Application Specific integrated Circuit ("ASIC") of the second network element.

2. The method of claim 1, wherein the deep loopback test is performed in addition to other loopback tests.

3. The method of claim 1, wherein the first network element is an F port of an FC switch and the second network element is an N port of a host bus adapter ("HBA").

4. The method of claim 3, wherein frames of the deep loopback test are looped back at an FC driver of the second network element.

5. The method of claim 1, wherein the first network element is an E port of one of a host bus adapter ("HBA") and a first FC switch and the second network element is another E port of a second FC switch.

6. The method of claim 5, wherein the deep loopback is performed on a data path between the first network element and the second network element.

7. The method of claim 5, wherein the deep loopback is performed on a control path between the first network element and the second network element and wherein frames of the deep loopback test are looped back at an FC-2 layer of the second network element.

8. The method of claim 1, wherein the exposed issue comprises at least one of unresponsive driver software, packet descriptor memory corruption, data structure corruption, FC driver memory leaks in an I/O path, large buffer transfer/receive processing hitting boundary conditions, and frame Direct Memory Access ("DMA") memory corrupting frames due to handling a sudden I/O burst.

9. The method of claim 1 further comprising:
determining a latency of the path by comparing a first timestamp of a frame of the deep loopback test corresponding to a time the frame was sent to the second network element with a second timestamp of the frame corresponding to another time the frame was received back from the second network element.

10. One or more non-transitory tangible media that includes code for execution and when executed by a processor is operable to perform operations comprising:
configuring a first network element of a fibre channel ("FC") network as a generator element, wherein the generator employs a link diagnostic protocol to cause a second network element comprising a peer of the first network element as a reflector element, wherein the first network element and the second network element are connected via a link;
entering a first diagnostic phase, wherein in the first diagnostic phase, diagnostic capabilities of the first network element and the second network element are determined; and
subsequent to completion of the first diagnostic phase, entering a second diagnostic phase in which a deep loopback test is performed, wherein the deep loopback test comprises a frame level loopback test for exposing an issue in a path between the first and second network elements beyond a Media Access Control ("MAC") layer, wherein frames of the deep loopback test are looped back at a crossbar Application Specific Integrated Circuit ("ASIC") of the second network element.

11. The media of claim 10, wherein the first network element is an F port of an FC switch and the second network element is an N port of a host bus adapter ("HBA") and wherein frames of the deep loopback test are looped back at an FC driver of the second network element.

12. The media of claim 10, wherein the first network element is an E port of one of a host bus adapter ("HBA") and a first FC switch and the second network element is another E port of a second FC switch and wherein the deep loopback is performed on a data path between the first and second network elements.

13. The media of claim 10, wherein the first network element is an E port of one of a host bus adapter ("HBA") and a first FC switch and the second network element is another E port of a second FC switch and wherein the deep loopback is performed on a control path between the first and second network elements and wherein frames of the deep loopback test are looped back at an FC-2 layer of the second network element.

14. The method of claim 1, wherein the exposed issue comprises at least one of unresponsive driver software, packet descriptor memory corruption, data structure corruption, FC driver memory leaks in an I/O path, large buffer transfer/receive processing hitting boundary conditions, and frame Direct Memory Access ("DMA") memory corrupting frames due to handling a sudden I/O burst.

15. The method of claim 1 further comprising determining a latency of the path by comparing a first timestamp of a frame of the deep loopback test corresponding to a time the frame was sent to the second network element with a second timestamp of the frame corresponding to another time the frame was received back from the second network element.

16. An apparatus comprising:
a memory element configured to store data; and
a processor operable to execute instructions associated with the data;
the apparatus configured for:
configuring a first network element of a fibre channel ("FC") network as a generator element, wherein the generator employs a link diagnostic protocol to cause a second network element comprising a peer of the first network element as a reflector element, wherein the first network element and the second network element are connected via a link;
entering a first diagnostic phase, wherein in the first diagnostic phase, diagnostic capabilities of the first network element and the second network element are determined; and
subsequent to completion of the first diagnostic phase, entering a second diagnostic phase in which a deep loopback test is performed, wherein the deep loopback test comprises a frame level loopback test for exposing an issue in a path between the first and second network elements beyond a Media Access Control ("MAC") layer, wherein frames of the deep loopback test are looped back at a crossbar Application Specific Integrated Circuit ("ASIC") of the second network element.

17. The apparatus of claim 16, wherein the first network element is an F port of an FC switch and the second network element is an N port of a host bus adapter ("HBA") and wherein frames of the deep loopback test are looped back at an FC driver of the second network element.

18. The apparatus of claim 16, wherein the first network element is an E port of one of a host bus adapter ("HBA") and a first FC switch and the second network element is another E port of a second FC switch and wherein the deep loopback is performed on a data path between the first and second network elements.

19. The apparatus of claim 16, wherein the first network element is an E port of one of a host bus adapter ("HBA") and a first FC switch and the second network element is another E port of a second FC switch and wherein the deep loopback is performed on a control path between the first and second network elements and wherein frames of the deep loopback test are looped back at an FC-2 layer of the second network element.

20. The apparatus of claim 16 further configured for determining a latency of the path by comparing a first timestamp of a frame of the deep loopback test corresponding to a time the frame was sent to the second network element with a second timestamp of the frame corresponding to another time the frame was received back from the second network element.

\* \* \* \* \*